(12) United States Patent
Ditsch

(10) Patent No.: US 8,772,556 B2
(45) Date of Patent: Jul. 8, 2014

(54) BIO-OIL PRODUCTION WITH OPTIMAL BYPRODUCT PROCESSING

(75) Inventor: Andre Ditsch, Houston, TX (US)

(73) Assignee: KiOR, Inc., Pasadena, TX (US)

( * ) Notice: Subject to any disclaimer, the term of this patent is extended or adjusted under 35 U.S.C. 154(b) by 959 days.

(21) Appl. No.: 12/888,193

(22) Filed: Sep. 22, 2010

(65) Prior Publication Data
US 2012/0067773 A1    Mar. 22, 2012

(51) Int. Cl.
C07C 1/00 (2006.01)

(52) U.S. Cl.
USPC ......... 585/240; 48/127.7; 48/197 R; 202/121; 202/126; 202/127

(58) Field of Classification Search
USPC ........ 585/240, 242; 48/127.7, 197 R; 201/21; 422/145; 202/121, 99, 120; 208/126, 208/127
See application file for complete search history.

(56) References Cited

U.S. PATENT DOCUMENTS

| | | | |
|---|---|---|---|
| 3,961,913 A | 6/1976 | Brenneman et al. | |
| 4,064,018 A | 12/1977 | Choi | |
| 4,147,593 A | 4/1979 | Frischmuth et al. | |
| 4,153,514 A | 5/1979 | Garrett et al. | |
| 4,207,167 A | 6/1980 | Bradshaw | |
| 4,266,083 A | 5/1981 | Huang | |
| 4,308,411 A | 12/1981 | Frankiewicz | |
| 4,678,860 A * | 7/1987 | Kuester | 585/14 |
| 4,711,873 A | 12/1987 | Suzukamo et al. | |
| 4,851,601 A | 7/1989 | Fukuda et al. | |
| 4,874,507 A | 10/1989 | Whitlock | |
| 4,987,114 A | 1/1991 | Suzukamo et al. | |
| 5,064,527 A | 11/1991 | Singhal et al. | |
| 5,097,088 A | 3/1992 | Fukao et al. | |
| 5,102,628 A | 4/1992 | De Lasa | |
| 5,115,084 A | 5/1992 | Himmelblau | |
| 5,233,109 A | 8/1993 | Chow | |
| 5,504,259 A | 4/1996 | Diebold et al. | |
| 5,599,510 A | 2/1997 | Kaminsky et al. | |
| 5,728,271 A | 3/1998 | Piskorz et al. | |

(Continued)

FOREIGN PATENT DOCUMENTS

| | | |
|---|---|---|
| CA | 1283880 | 5/1991 |
| CA | 2618000 A1 | 2/2007 |

(Continued)

OTHER PUBLICATIONS

Terry Marker, Larry Felix, and Martin Linck, Integrated Hydropyrolysis and Hydroconversion (IH2) Process for Production of Gasoline and Diesel Fuel from Biomass, tcbiomass2009, The International Conference on Thermochemical Conversion Science, Sep. 18, 2009, pp. 1-25, Gas Technology Institute.

(Continued)

Primary Examiner — Nina Bhat
(74) Attorney, Agent, or Firm — Hovey Williams LLP

(57) ABSTRACT

A process and system for the conversion of biomass under high severity in the presence of a catalyst to produce a bio-oil, olefins, methane, and carbon monoxide (CO). The methane and/or CO can be used to generate hydrogen and the generated hydrogen can be used for hydrotreating the bio-oil. Additionally, or alternatively, a syngas stream, a carbon dioxide-rich stream, and/or a methane-rich stream can be recovered for use in the bio-oil production process and/or for use in a conventional petroleum refinery and/or petrochemical plant.

39 Claims, 2 Drawing Sheets

(56) References Cited

U.S. PATENT DOCUMENTS

| | | | |
|---|---|---|---|
| 5,792,340 A | 8/1998 | Freel et al. | |
| 5,865,898 A | 2/1999 | Hotzapple et al. | |
| 5,959,167 A | 9/1999 | Shabtai et al. | |
| 5,961,786 A * | 10/1999 | Freel et al. | 202/121 |
| 6,022,419 A | 2/2000 | Torget et al. | |
| 6,069,012 A | 5/2000 | Kayser | |
| 6,248,297 B1 | 6/2001 | Stine et al. | |
| 6,485,774 B1 | 11/2002 | Bransby | |
| 6,814,940 B1 | 11/2004 | Hiltunen et al. | |
| 6,830,597 B1 | 12/2004 | Green | |
| 6,971,594 B1 | 12/2005 | Polifka | |
| 6,976,362 B2 | 12/2005 | Sheppard et al. | |
| 7,044,999 B2 | 5/2006 | Bankstahl et al. | |
| 7,202,389 B1 | 4/2007 | Brem | |
| 7,262,331 B2 | 8/2007 | Van de Beld et al. | |
| 7,341,973 B2 | 3/2008 | Flego et al. | |
| 7,503,981 B2 | 3/2009 | Wyman | |
| 8,043,391 B2 * | 10/2011 | Dinjus et al. | 48/197 R |
| 8,217,210 B2 * | 7/2012 | Agrawal et al. | 585/240 |
| 8,217,211 B2 * | 7/2012 | Agrawal et al. | 585/240 |
| 8,236,173 B2 * | 8/2012 | Bartek et al. | 208/400 |
| 8,383,871 B1 * | 2/2013 | Sellars et al. | 585/240 |
| 8,501,043 B2 * | 8/2013 | O'Connor et al. | 252/373 |
| 8,541,637 B2 * | 9/2013 | Babicki et al. | 585/240 |
| 2004/0180971 A1 | 9/2004 | Inoue et al. | |
| 2005/0145542 A1 | 7/2005 | O'Connor et al. | |
| 2006/0074132 A1 | 4/2006 | Allam et al. | |
| 2007/0000177 A1 | 1/2007 | Hippo et al. | |
| 2007/0213573 A1 | 9/2007 | Ross et al. | |
| 2007/0225383 A1 | 9/2007 | Cortright et al. | |
| 2008/0009055 A1 | 1/2008 | Lewnard | |
| 2008/0103344 A1 * | 5/2008 | Jones et al. | 585/242 |
| 2009/0013601 A1 | 1/2009 | Mandich et al. | |
| 2009/0093555 A1 | 4/2009 | Stites et al. | |
| 2009/0139851 A1 | 6/2009 | Freel | |
| 2009/0151251 A1 | 6/2009 | Manzer et al. | |
| 2009/0158663 A1 | 6/2009 | Deluga et al. | |
| 2009/0165378 A1 | 7/2009 | Agblevor | |
| 2009/0227823 A1 | 9/2009 | Huber et al. | |
| 2009/0239279 A1 | 9/2009 | Hall et al. | |
| 2010/0076238 A1 | 3/2010 | Brandvold et al. | |
| 2010/0105970 A1 | 4/2010 | Yanik et al. | |
| 2010/0162625 A1 | 7/2010 | Mills | |

FOREIGN PATENT DOCUMENTS

| | | |
|---|---|---|
| DE | 202006012176 | 12/2006 |
| EP | 1719811 A1 | 11/2006 |
| EP | 1852466 A1 | 11/2007 |
| EP | 1852490 A1 | 11/2007 |
| EP | 1852492 A1 | 11/2007 |
| EP | 1878783 A1 | 1/2008 |
| EP | 2105486 A1 | 9/2009 |
| EP | 2107100 A1 | 10/2009 |
| WO | WO81/01713 A1 | 6/1981 |
| WO | WO02/14040 A1 | 2/2002 |
| WO | WO02/083816 A1 | 10/2002 |
| WO | WO2006/117006 A1 | 11/2006 |
| WO | WO2007/128798 A1 | 11/2007 |
| WO | WO2007/128799 A1 | 11/2007 |
| WO | WO2007/128800 A1 | 11/2007 |
| WO | WO2008/009643 A2 | 1/2008 |
| WO | WO2008/011598 A2 | 1/2008 |
| WO | WO2008/101949 A1 | 8/2008 |
| WO | WO2009/118352 A1 | 10/2009 |
| WO | WO2009/143017 A1 | 11/2009 |
| WO | WO2010/002792 A2 | 1/2010 |
| WO | WO2010/033789 | 3/2010 |

OTHER PUBLICATIONS

International Search Report and Written Opinion for co-pending PCT Application No. PCT/US2011/048902, filed Aug. 24, 2011; Dated Jan. 11, 2012; 6 pages.

Oasmaa et al.; Norms and Standards for Pyrolysis Liquids, End-User Requirements and Specifications; Energy Fuels, 2005 19 (5), pp. 2155-2163; DOI: 10.1021/ef040094o; Aug. 12, 2005.

Lappas, A.A., et al. "Biomass Pyrolysis in a Circulating Fluid Bed Reactor for the Production of Fuels and Chemicals" Fuel IPC Science and Technology Press, Guildford, GB, vol. 81, No. 16, Nov. 1, 2002, pp. 2087-2095, XP004374414, ISSN: 0016-2361.

Huber, George, W., et al. "Synthesis of Transportation Fuels From Bomass: Chemistry, Catalysts and Engineering" Chem.Rev.,; Chemical Reviews, Sep. 2006, vol. 106, No. 9, pp. 40-44-4098, 4047-4048, 4061-4063, 4085, 4092-4093, XP002490759.

McKendry, P., "Energy Production From Biomass," Bioresource Technology 83 (2002) p. 37-46.

Wyman, et al, "Coordinated Development of Leading Biomass Pretreatment Technologies" Bioresource Technology 96 (2005) 1959-1966.

Bridgwater, A.V. "Principles and Practice of Biomass Fast Pyrolysis Processes for Liquids" Journal of Analytical and Applied Pyrolysis, Jul. 1999 vol. 51, pp. 3-22, p. 15, para 4 to p. 16 para 2; p. 18, para 2.

Bridgwater, A.V., et al, "Fast Pyrolysis Processes for Biomass," Renewable and Sustainable Energy Reviews 4 (2000) 1-73.

* cited by examiner

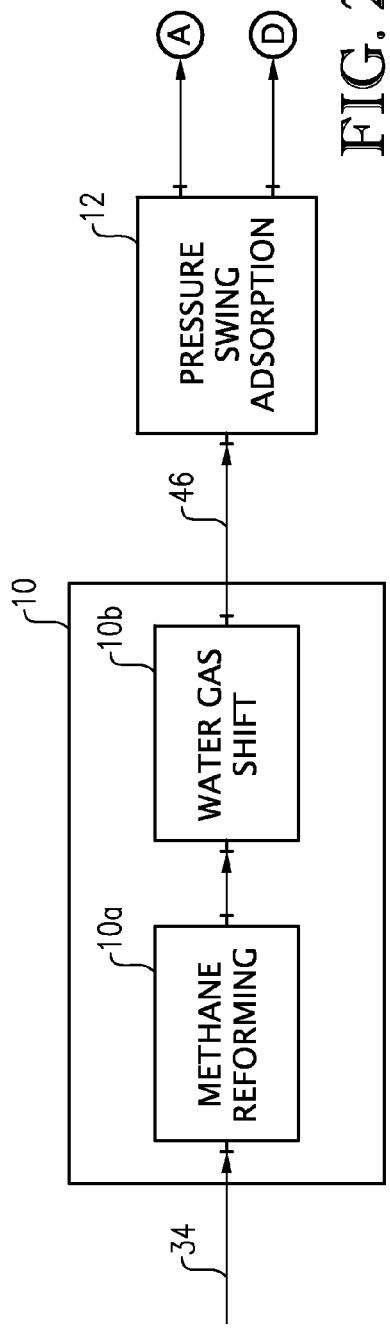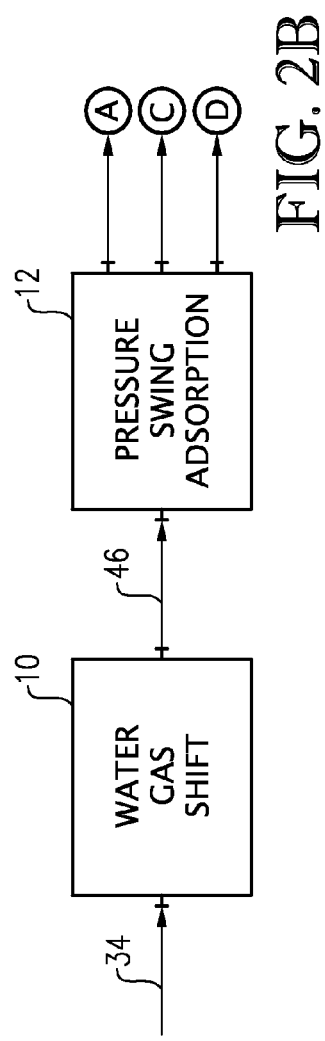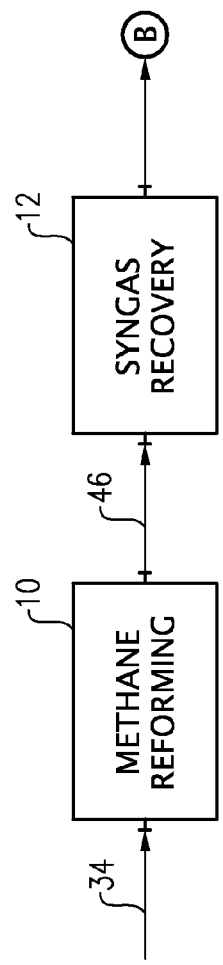

BIO-OIL PRODUCTION WITH OPTIMAL BYPRODUCT PROCESSING

BACKGROUND

1. Field of the Invention

The present invention relates generally to the conversion of biomass under high severity to produce high quality bio-oil and byproducts, wherein the byproducts can be recovered and/or processed to provide one or more commercially valuable streams.

2. Description of the Related Art

With the rising costs and environmental concerns associated with fossil fuels, renewable energy sources have become increasingly important. The development of renewable fuel sources provides a means for reducing the dependence on fossil fuels. Accordingly, many different areas of renewable fuel research are currently being explored and developed.

With its low cost and wide availability, biomass has increasingly been emphasized as an ideal feedstock in renewable fuel research. Consequently, many different conversion processes have been developed that use biomass as a feedstock to produce useful biofuels and/or specialty chemicals. Existing biomass conversion processes include, for example, combustion, gasification, slow pyrolysis, fast pyrolysis, liquefaction, and enzymatic conversion. One of the useful products that may be derived from the aforementioned biomass conversion processes is a liquid product commonly referred to as "bio-oil." Bio-oil may be processed into transportation fuels, hydrocarbon chemicals, and/or specialty chemicals.

Although many of these biomass conversion processes can produce high yields of bio-oil, most, if not all, of the bio-oil produced is of low quality due to the high amounts of oxygen present in the bio-oil. Due to the high amounts of oxygen, these low quality bio-oils require extensive secondary upgrading in order to be utilized as transportation fuels and/or as fuel additives. However, many secondary upgrading processes, such as hydrotreatment, are prohibitively expensive due to the need for excess hydrogen in upgrading the bio-oil. Since hydrogen is not naturally produced during most biomass conversion reactions, it must be acquired through an outside source, thus adding to the costs of upgrading bio-oil.

Accordingly, there is a need for an improved process and system for producing and upgrading bio-oil into renewable fuels and/or fuel additives.

SUMMARY OF THE INVENTION

In one embodiment, the present invention is directed to a process for producing bio-oil and processing byproducts of bio-oil production, said process comprising (a) pyrolyzing biomass in a conversion reactor in the presence of a catalyst to thereby produce a reactor effluent comprising bio-oil, carbon monoxide (CO), and methane, wherein the weight ratio of CO to bio-oil in the reactor effluent is at least 0.5:1, wherein the weight ratio of methane to bio-oil in the reactor effluent is at least 0.05:1; (b) condensing and separating a substantial portion of the bio-oil from the reactor effluent, thereby leaving an uncondensed stream comprising at least a portion of the methane and at least a portion of the CO; and (c) generating hydrogen by reacting water with at least a portion of the CO and/or at least a portion of the methane, thereby producing a hydrogen-enriched stream comprising generated hydrogen, wherein the process produces generated hydrogen at a rate that is at least 0.5 percent of the rate of introduction of the biomass into the conversion reactor on a weight basis.

In another embodiment, the present invention is directed to a process for producing bio-oil and processing byproducts of bio-oil production, said process comprising (a) pyrolyzing biomass in a riser reactor in the presence of a catalyst to thereby produce a reactor effluent comprising bio-oil, CO, olefins, and methane, wherein the weight ratio of CO to bio-oil in the reactor effluent is at least 0.5:1, wherein the weight ratio of olefins to bio-oil in the reactor effluent is at least 0.1:1, wherein the weight ratio of methane to bio-oil in the reactor effluent is at least 0.05:1; (b) condensing and separating a substantial portion of the bio-oil from the reactor effluent, thereby leaving an uncondensed stream comprising at least a portion of the methane and at least a portion of the CO; (c) generating hydrogen from at least a portion of the uncondensed stream to thereby produce a hydrogen-enriched stream comprising generated hydrogen; and (d) recovering from at least a portion of the hydrogen-enriched stream at least one of the following recovered streams: (i) a syngas stream comprising hydrogen and at least a portion of CO, wherein the hydrogen and the CO make up at least 75 weight percent of the syngas stream, (ii) a hydrogen-rich stream, wherein hydrogen makes up at least 75 weight percent of the hydrogen-rich stream, (iii) a carbon dioxide-rich stream comprising at least 75 weight percent carbon dioxide ($CO_2$), and/or (iv) a methane-rich stream, wherein methane makes up at least 75 weight percent of the methane-rich stream. When the syngas stream is recovered in step (d), the process produces the syngas stream at a rate that is at least 5 percent of the rate of introduction of the biomass into the conversion reactor on a weight basis. When the hydrogen-rich stream is recovered in step (d), the process produces the hydrogen-rich stream at a rate that is at least 0.5 percent of the rate of introduction of the biomass into the conversion reactor on a weight basis. When the $CO_2$-rich stream is recovered in step (d), the process produces the $CO_2$-rich stream at a rate that is at least 5 percent of the rate of introduction of the biomass into the conversion reactor on a weight basis. When the methane-rich stream is recovered in step (d), the process produces the methane-rich stream at a rate that is at least 0.5 percent of the rate of introduction of the biomass into the conversion reactor on a weight basis.

In a further embodiment, the present invention is directed to a system for producing bio-oil, the system comprising a biomass feedstock source for providing solid particulate biomass; a conversion reactor for thermally converting at least a portion of the solid particulate biomass feedstock into a reactor effluent comprising bio-oil, carbon monoxide (CO), olefins, and methane; a partial condenser for partially condensing at least a portion of the reactor effluent into a bio-oil stream and an uncondensed stream; an olefin removal unit for removing olefins from the uncondensed stream thereby providing an olefin-depleted stream; a hydrogen generation unit having a water inlet, wherein the hydrogen generation unit is operable to generate hydrogen by reacting water with CO and/or methane from the olefin-depleted stream; and a hydrotreater for reacting at least a portion of the bio-oil stream with at least a portion of the generated hydrogen from the hydrogen generation unit.

BRIEF DESCRIPTION OF THE FIGURES

Embodiments of the present invention are described herein with reference to the following drawing figures, wherein:

FIG. 2A is a schematic diagram of a hydrogen generation and stream recovery system according to another embodiment of the present invention;

FIG. 2B is a schematic diagram of a hydrogen generation and stream recovery system according to another embodiment of the present invention; and FIG. 2C is a schematic diagram of a hydrogen generation and stream recovery system according to another embodiment of the present invention.

DETAILED DESCRIPTION

Figure 1:
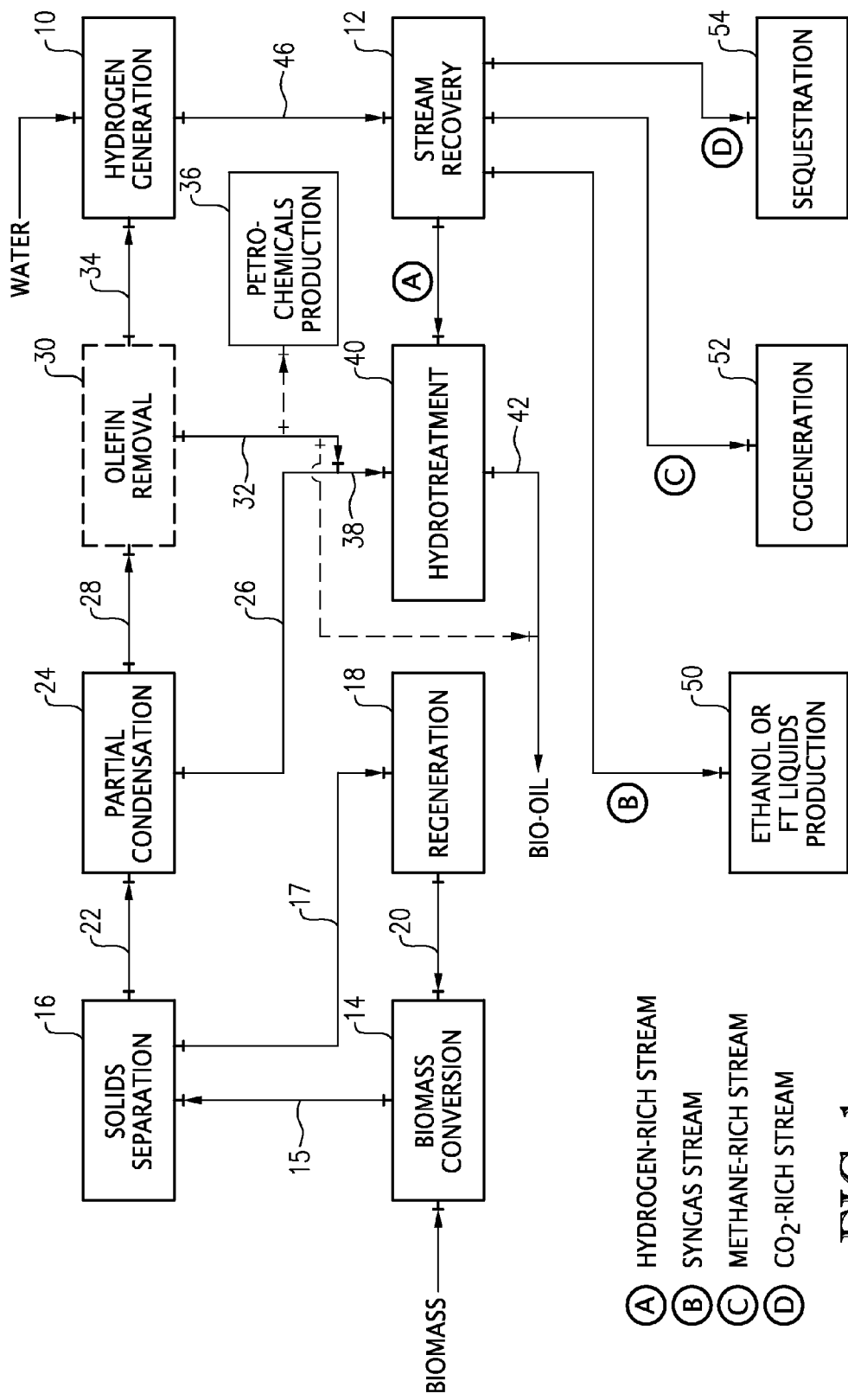
FIG. 1 is a schematic diagram of a biomass conversion system according to one embodiment of the present invention.

FIG. 1 depicts a biomass conversion system that includes a hydrogen generation system 10 for generating hydrogen that may be used for upgrading the produced bio-oil. The biomass conversion system of FIG. 1 also includes a stream recovery system 12 that, depending on upstream processing parameters, recovers one or more commercially valuable streams that originate from the byproducts of biomass conversion. It should be understood that the biomass conversion system shown in FIG. 1 is just one example of a system within which the present invention can be embodied. The present invention may find application in a wide variety of other systems where it is desirable to efficiently and effectively produce bio-oil, upgrade bio-oil, generate hydrogen, and/or produce a number of useful products from the byproducts of biomass conversion. The exemplary biomass conversion system illustrated in FIG. 1 will now be described in detail.

The biomass conversion system of FIG. 1 begins by subjecting a biomass feedstock to thermochemical conversion in a conversion reactor 14. The biomass feedstock may be derived from any biomass source. The biomass source can be, for example, a hopper, storage bin, railcar, over-the-road trailer, or any other device that may hold or store biomass. The biomass supplied by the biomass source can be any type of biomass that may be converted into a bio-oil. Generally, the biomass can be solid biomass materials comprising cellulosic materials, in particular lignocellulosic materials, because of the abundant availability of such materials and their low cost. The solid biomass feed can comprise components selected from the group consisting of lignin, cellulose, hemicellulose, and/or combinations thereof. Suitable cellulose-containing materials can include, for example, algae, paper waste, and/or cotton linters. Examples of suitable lignocellulosic materials can include forestry waste such as wood chips, saw dust, pulping waste, and tree branches; agricultural waste such as corn stover, wheat straw, and bagasse; and/or energy crops such as eucalyptus, switch grass, and coppice.

The biomass feedstock may undergo a number of pretreatments prior to being introduced into the conversion reactor 14. Such pretreatments may include drying, roasting, torrefaction, demineralization, steam explosion, swelling with an acid and/or base, mechanical agitation, and/or any combination thereof.

In one embodiment, it may be desirable to combine the biomass feedstock with a catalyst prior to introducing the biomass feedstock into the conversion reactor 14. Alternatively, the biomass feedstock and catalyst may be combined in the conversion reactor 14 during biomass conversion. The catalyst may be fresh and/or regenerated catalyst. The catalyst can, for example, comprise a solid acid, such as a zeolite. Examples of suitable zeolites include ZSM-5 and zeolite-Y. Additionally, the catalyst may comprise a super acid. Examples of suitable super acids include sulfonated, phosphated, or fluorinated forms of zirconia, titania, alumina, silica-alumina, and/or clays. In another embodiment, the catalyst may comprise a solid base. Examples of suitable solid bases include metal oxides, metal hydroxides, and/or metal carbonates. In particular, the oxides, hydroxides, and carbonates of alkali metals, alkaline earth metals, transition metals, and/or rare earth metals are suitable. Other suitable solid bases are layered double hydroxides, mixed metal oxides, hydrotalcites, clays, and/or combinations thereof. In yet another embodiment, the catalyst can also comprise an alumina, such as alpha-alumina.

The catalyst for the thermochemical conversion of biomass can also be an equilibrium catalyst (E-cat) from a fluid catalytic cracking (FCC) unit of an oil refinery. This term refers to catalyst material that has, on average, circulated in the FCC unit for a considerable length of time. The term is used to distinguish fresh catalyst, which has not been exposed to the environment of the FCC unit, and which has much greater catalytic activity than the E-cat. This spent catalyst is a waste product from oil refineries, and as such, is abundantly available at low cost.

It should be noted that solid biomass materials generally contain minerals. It is recognized that some of these minerals, such as potassium carbonate, can have catalytic activity in the conversion of biomass material. Even though these minerals are typically present during biomass conversion, they are not considered catalysts.

During biomass conversion, the biomass feedstock is introduced into the conversion reactor 14, wherein the biomass feedstock is subjected to a thermochemical conversion reaction that produces bio-oil, carbon monoxide (CO), methane, and olefins. The conversion reactor 14 can facilitate different thermochemical conversion reactions such as fast pyrolysis, slow pyrolysis, liquefaction, gasification, or enzymatic conversion. The conversion reactor 14 can be, for example, a fluidized bed reactor, a cyclone reactor, an ablative reactor, or a riser reactor.

In one embodiment, the conversion reactor 14 can be a riser reactor and the conversion reaction can be fast pyrolysis under high severity. Such high severity fast pyrolysis can also include catalytic cracking. As used herein, "pyrolysis" refers to the chemical conversion of biomass caused by rapidly heating the feedstock in an atmosphere that is substantially free of oxygen. Pyrolysis can be carried out in the presence of an inert gas, such as nitrogen, carbon dioxide, and/or steam. Alternatively, pyrolysis can be carried out in the presence of a reducing gas, such as hydrogen, carbon monoxide, non-condensable gases recycled from the biomass conversion process, and/or any combination thereof.

Fast pyrolysis is characterized by short residence times and rapid heating of the biomass feedstock. The residence times of fast pyrolysis can be, for example, less than 10 seconds, less than 5 seconds, or less than 2 seconds. High severity fast pyrolysis can occur at temperatures of at least 300° C., 400° C., or 500° C. and not more than 1,000° C., 800° C., or 700° C.

Referring again to FIG. 1, the conversion reactor 14 can emit a reactor effluent 15 that generally comprises light gases, vapors, and solids. As used herein, the vapors produced during biomass conversion are synonymous with and may be interchangeably referred to as "bio-oil," which is the common name for the vapors when condensed into their liquid state. In the case of fast pyrolysis, the solids in the reactor effluent 15 generally comprise particles of char, coke, ash, and/or spent catalyst. Likewise, the light gases produced from fast pyrolysis can comprise olefins, methane, and/or CO. The olefins produced during biomass conversion can be comprised of ethylene, propylene, butenes, pentenes, and/or combinations thereof. Generally, ethylene and propylene in combination make up at least 50, 75, or 90 weight percent of the total olefins in the reactor effluent 15.

The biomass conversion reaction carried out in conversion reactor 14 can produce bio-oil at a rate that is at least 4, 6, or 8 percent and not more than 50, 30, or 20 percent of the rate of introduction of the biomass feedstock into the conversion reactor 14 on a weight basis. The biomass conversion can produce CO at a rate that is at least 10, 20, or 30 percent and not more than 80, 70, or 60 percent of the rate of introduction of the biomass feedstock into the conversion reactor 14 on a weight basis. The biomass conversion can produce methane at a rate that is at least 0.5, 1, or 2 percent and not more than 30, 20, or 10 percent of the rate of introduction of the biomass feedstock into the conversion reactor 14 on a weight basis. The biomass conversion can produce olefins at a rate that is at least 2, 4, or 6 percent and not more than 40, 24, or 15 percent of the rate of introduction of the biomass feedstock into the conversion reactor 14 on a weight basis. The biomass conversion can produce water at a rate that is at least 4, 6, or 8 percent and not more than 50, 30, or 20 percent of the rate of introduction of the biomass feedstock into the conversion reactor 14 on a weight basis. The biomass conversion can produce hydrogen at a rate that is less than 3, 1.5, or 0.75 percent of the rate of introduction of the biomass feedstock into the conversion reactor 14 on a weight basis.

The reactor effluent 15 from conversion reactor 14 can contain a weight ratio of CO to bio-oil that is at least 0.5:1, 1:1, 2:1, or 2.5:1 and not more than 10:1, 8:1, or 7:1; a weight ratio of methane to bio-oil that is at least 0.05:1, 0.1:1, 0.2:1, or 0.25:1 and not more than 1:1, 0.8:1, or 0.7:1; a weight ratio of olefins to bio-oil that is at least 0.1:1, 0.2:1, 0.4:1, or 0.5:1 and not more than 4:1, 3:1, or 2:1; and/or a weight ratio of hydrogen to bio-oil that is less than 0.1:1, 0.05:1, 0.03:1, and 0.01:1.

Referring again to FIG. 1, the reactor effluent 15 can be subjected to solids separation in a solids separator 16. The solids separator 16 can be any conventional device capable of separating solids from gas and vapors such as, for example, a cyclone separator or a gas filter. The solids separator 16 removes a substantial portion of the solids (e.g., spent catalysts, coke, char, and/or heat carrier solids) from the reactor effluent 15. The solid particles 17 recovered from the solids separator 16 can be introduced into a regenerator 18, wherein the solid particles 17 are subjected to regeneration, typically by combustion. During regeneration, the coke that has formed on the spent catalysts may be combusted, thus regenerating the catalysts. After regeneration, at least a portion of the hot regenerated solids 20 can be recycled for use again in the biomass conversion process.

As depicted in FIG. 1, the separated light gases and vapors 22 from the solids separator 16 can be introduced into a partial condenser 24 for partial condensation. In the partial condenser 24, the vapors are condensed into a bio-oil stream 26 and are separated from the remaining light gases. The separated and condensed bio-oil can have an oxygen content that is less than 25, 20, or 15 weight percent. The separated light gases are removed from the partial condenser 24 as an uncondensed gas stream 28 comprising the light gases.

The uncondensed gas stream 28, which can include substantially all of the olefins, methane, and/or CO originally present in the reactor effluent 15, may be subjected to an optional olefin removal step in an olefin removal system 30. The olefin removal system 30 can remove at least 50, 75, or 95 weight percent of the olefins originally present in the reactor effluent 15. During olefin removal, at least a portion of the uncondensed gas stream 28 can be introduced into an olefin removal system 30, wherein at least a portion of the uncondensed gas stream 28 is condensed into an olefin stream 32 comprising at least 75, 85, or 95 percent of the olefins originally present in the reactor effluent 15. Meanwhile, the uncondensed gases can be separated into an olefin-depleted stream 34 comprising the non-condensable gases, such as methane and CO.

During olefin removal, at least a portion of the uncondensed gas stream 28 can be subjected to various olefin removal reactions so as to remove the olefins from the non-condensable gases. The olefins can be separated by a method selected from the group comprising of alkylation, catalytic polymerization, aromatization, and/or combinations thereof. During these reactions, the olefins can be converted into hydrocarbons having at least five, between five and fourteen, or between five and nine carbon atoms per molecule.

Separation using alkylation can include charging isobutane to the olefin removal system 30 for alkylation with the olefins to form alkylated hydrocarbons having six to eight carbon atoms per molecule. Such alkylated hydrocarbons can primarily be isoparaffins.

Separation using alkylation can also include charging aromatics to the olefin removal system 30, either alone or along with the isobutane described above, for alkylation with the olefins to form alkylated aromatics having from eight to fourteen carbon atoms per molecule. The alkylated aromatics can comprise chemicals selected from the group consisting of ethyl benzene, cumene, and/or combinations thereof. As depicted in FIG. 1, when this method is used, at least a portion of the olefin stream 32 can be separated from the conversion product stream for use in a petrochemicals production facility 36.

Separation by catalytic polymerization can include reacting the olefins with each other over an acidic catalyst contained in the olefin removal system 30 to form the olefin stream 32 comprising olefinic oligomers having six to twelve carbon atoms per molecule.

The separation process can also be by aromatization which includes contacting the olefins with a zeolite catalyst in the olefin removal system 30 at a temperature in the range of from about 300° C. to about 450° C., so as to form the olefin stream 32 comprising of aromatics and paraffins.

Referring again to FIG. 1, after olefin removal, at least a portion of the olefin stream 32 can be blended with at least a portion of the bio-oil stream 26 to form a heavy bio-oil 38. The heavy bio-oil 38 may be used as a fuel or fuel blending stock, or it may be subjected to further processing. At least a portion of the bio-oil stream 26 and/or heavy bio-oil 38 can be subjected to hydrotreatment in a hydrotreater 40 to produce a deoxygenated bio-oil 42. Alternatively, at least a portion of the olefin stream 32 can be blended directly with at least a portion of the deoxygenated bio-oil 42.

The hydrotreater 40 can be any conventional hydrotreater commonly known and used in the art. The hydrotreater 40 removes oxygen from the bio-oil stream 26 and/or heavy bio-oil 38 to produce the deoxygenated bio-oil 42. The oxygen content of the deoxygenated bio-oil 42 can be less than 10, 5, or 1 weight percent. The deoxygenated bio-oil 42 can also have a Total Acid Number (TAN) value that is at least 50, 70, or 90 percent less than the TAN value of the bio-oil stream 26. Generally, the deoxygenated bio-oil 42 can be produced at a rate that is at least 4, 6, or 8 percent and not more than 50, 30, or 20 percent of the rate of introduction of the biomass into the conversion reactor 14 based on a weight basis. The deoxygenated bio-oil 42 may be used as a fuel and/or fuel blendstock.

Referring again to FIG. 1, at least a portion of the olefin-depleted stream 34, or uncondensed gas stream 28 when the olefin removal system 30 is not employed, can be subjected to hydrogen generation in a hydrogen generation system 10. In the hydrogen generation system 10, hydrogen can be generated by reacting water with at least a portion of the methane and/or at least a portion of the CO thereby producing a hydrogen-enriched stream 46 comprising generated hydrogen and at least a portion of the methane and/or CO. In particular, hydrogen generation can be facilitated by a water gas shift reaction, methane reforming, and/or methane reforming followed by a water gas shift reaction. The water gas shift reaction generates hydrogen and $CO_2$ by reacting at least a portion of the CO with water in a water gas shift reactor. Similarly, methane-reforming generates hydrogen and $CO_2$ by subjecting at least a portion of the methane to high temperature steam in the presence of a catalyst in a methane reformer. The hydrogen-enriched stream 46 can be produced at a rate that is at least 0.5, 1, or 2 percent and no more than 20, 15, or 10 percent of the rate of introduction of the biomass into the conversion reactor 14 on a weight basis.

As illustrated in FIG. 1, the hydrogen-enriched stream 46 can be subjected to stream recovery in a stream recovery system 12. During stream recovery, the hydrogen-enriched stream 46 can be divided into a number of distinct streams by, for example, pressure swing adsorption or syngas recovery. Pressure swing adsorption (PSA) occurs in a PSA unit and can be used to separate a particular gas species from a mixture of gases by using adsorptive materials (e.g., zeolites) that may act as a molecular sieve. Syngas recovery may utilize any conventional gas separator, gas filter, or any other system known in the art that may be used to filter gases.

The stream recovery system 12 can yield at least one of the following streams: a hydrogen-rich stream (A), a syngas stream (B), a methane-rich stream (C), and/or a $CO_2$-rich stream (D). The recovered streams can include any of the streams listed above, either alone or in any combination.

At least a portion of the hydrogen-rich stream (A) may be used for hydrotreating either the bio-oil stream 26 and/or the heavy bio-oil 38. Generated hydrogen can make up at least 75, 90, 95, or 99 weight percent of the hydrogen-rich stream (A). In one embodiment, at least 75, 85, 95, or 99 weight percent of the hydrogen used in hydrotreatment can be generated hydrogen from the hydrogen-rich stream (A). The hydrogen-rich stream (A) can be produced at a rate that is at least 0.5, 1, or 2 percent and not more than 20, 15, or 10 percent of the rate of introduction of the biomass into the conversion reactor 14 on a weight basis.

At least a portion of the recovered syngas stream (B) can be removed from the system and be introduced into an ethanol and/or Fischer-Tropsch liquids production system 50. Generated hydrogen and CO can make up at least 75, 85, 95, or 99 weight percent of the syngas stream (B). The syngas stream (B) can be produced at a rate that is at least 5, 10, or 15 percent and not more than 60, 40, or 30 percent of the rate of introduction of the biomass into the conversion reactor 14 on a weight basis.

At least a portion of the methane-rich stream (C) can be introduced into a cogeneration system 52. Methane can make up at least 75, 90, 95, or 99 weight percent of the methane-rich stream (C). The methane-rich stream (C) can be produced at a rate that is at least 0.5, 1, or 2 percent and not more than 30, 20, or 10 percent of the rate of introduction of the biomass into the conversion reactor 14 on a weight basis.

At least a portion of the $CO_2$-rich stream (D) can be introduced into a sequestration system 54. The $CO_2$-rich stream (D) can comprise at least 75, 90, 95, or 99 weight percent $CO_2$. The $CO_2$-rich stream (D) can be produced at a rate that is at least 5, 10, or 15 percent and not more than 50, 40, or 30 percent of the rate of introduction of the biomass into the conversion reactor 14 on a weight basis.

FIGS. 2A, 2B, and 2C illustrate alternative embodiments of the hydrogen generation system 10 and the stream recovery system 12 used in the present invention. All of the components in FIGS. 2A, 2B, and/or 2C that have the same numerical reference as that in FIG. 1 have the same function and/or description as set forth above.

In the embodiment depicted in FIG. 2A, the hydrogen generation system 10 is a two-step system involving (1) a methane reformer 10a and (2) a water gas shift reactor 10b. In this embodiment, the methane in the uncondensed gas stream 28 and/or olefin-depleted stream 34 is converted to hydrogen and CO in the methane reformer 10a. Any residual CO produced during methane reforming is subjected to a water gas reaction in the water gas shift reactor 10b to convert the residual CO into hydrogen. The hydrogen-enriched stream 46 produced from this two-step process is introduced into a pressure swing adsorption system 12 to produce a hydrogen-rich stream (A) and a $CO_2$-rich stream (D).

As depicted in FIG. 2B, the hydrogen generation system 10 contains only a water gas shift reactor. The produced hydrogen-enriched stream 46 is introduced into a pressure swing adsorption system 12 to produce a hydrogen-rich stream (A), a methane-rich stream (C), and a $CO_2$-rich stream (D).

As depicted in FIG. 2C, the hydrogen generation system 10 contains only a methane reformer. The produced hydrogen-enriched stream 46 is subjected to syngas recovery 12 to produce a syngas stream (B). No other stream is recovered in this embodiment.

EXAMPLE

For the separate runs listed in Table 1 below, wood was charged to a pyrolysis reactor for contact with kaolin and zeolite catalysts at different inlet riser reaction temperatures. Results from the runs are set out in Table 1 below.

TABLE 1

|  | Low Severity Kaolin | High Severity Kaolin | Low Severity Zeolite | High Severity Zeolite |
|---|---|---|---|---|
| Riser Inlet Temp. (° F.) | 1230 | 1265 | 1230 | 1265 |
| Cat/feed ratio (wt/wt) | 13.5 | 31.2 | 13.3 | 22.9 |
| CO/Bio-oil ratio (wt/wt) | 0.71 | 6.41 | 1.00 | 4.09 |
| Methane/Bio-oil ratio (wt/wt) | 0.07 | 0.70 | 0.05 | 0.32 |
| Hydrogen/Bio-oil ratio (wt/wt) | 0.01 | 0.09 | 0.01 | 0.03 |

As can be seen from Table 1 above, as the severity of the biomass conversion is increased (increased temperature and increased catalyst to feed ratio), the weight ratios of CO, methane, and hydrogen to bio-oil all increase. In particular, the increases in CO and methane resulting from the high severity runs are sufficient to generate enough hydrogen to adequately hydrotreat the produced bio-oil without requiring hydrogen from external sources.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

It is the inventor's intent to rely on the Doctrine of Equivalents to determine and assess the reasonably fair scope of the present invention as it pertains to any processes and systems not materially departing from but outside the literal scope of the invention as set forth in the following claims.

What is claimed is:

1. A process for producing bio-oil and processing byproducts of bio-oil production, said process comprising:
   (a) pyrolyzing biomass in a conversion reactor in the presence of a catalyst to thereby produce a reactor effluent comprising bio-oil, carbon monoxide (CO), and methane, wherein the weight ratio of said CO to said bio-oil in said reactor effluent is at least 0.5:1, wherein the weight ratio of said methane to said bio-oil in said reactor effluent is at least 0.05:1;
   (b) condensing and separating a substantial portion of said bio-oil from said reactor effluent, thereby leaving an uncondensed stream comprising at least a portion of said methane and at least a portion of said CO; and
   (c) generating hydrogen by reacting water with at least a portion of said CO and/or at least a portion of said methane, thereby producing a hydrogen-enriched stream comprising generated hydrogen, wherein said process produces said generated hydrogen at a rate that is at least 0.5 percent of the rate of introduction of said biomass into said conversion reactor on a weight basis.

2. The process of claim 1 wherein said generating of step (c) comprises methane reforming.

3. The process of claim 1 wherein said generating of step (c) comprises a water gas shift reaction.

4. The process of claim 1 wherein said generating of step (c) comprises methane reforming followed by a water gas shift reaction.

5. The process of claim 1 further comprising hydrotreating at least a portion of said condensed and separated bio-oil using at least a portion of said generated hydrogen.

6. The process of claim 5 wherein at least 75 weight percent of the hydrogen used in said hydrotreating is said generated hydrogen.

7. The process of claim 1 wherein said pyrolyzing is carried out at a temperature of at least 300° C. and not more than 1,000° C., wherein said pyrolyzing includes catalytic cracking, wherein the oxygen content of said condensed and separated bio-oil is less than 25 weight percent.

8. The process of claim 1 wherein the weight ratio of said CO to said bio-oil in said reactor effluent is at least 1:1 and not more than 10:1, wherein the weight ratio of said methane to said bio-oil in said reactor effluent is at least 0.1:1 and not more than 1:1.

9. The process of claim 1 wherein said generating of step (c) produces said generated hydrogen at a rate that is at least 1 percent and not more than 20 percent of the rate of introduction of said biomass into said conversion reactor on a weight basis.

10. The process of claim 1 wherein said reactor effluent further comprises olefins, wherein the weight ratio of said olefins to said bio-oil in said reactor effluent is at least 0.1:1.

11. The process of claim 10 further comprising, prior to said generating of step (c), removing at least 50 weight percent of said olefins originally present in said reactor effluent.

12. The process of claim 10 wherein ethylene and propylene in combination make up at least 50 weight percent of said olefins present in said reactor effluent.

13. The process of claim 1 wherein said conversion reactor produces said bio-oil at a rate that is at least 4 percent and not more than 50 percent of the rate of introduction of said biomass into said conversion reactor on a weight basis, wherein said conversion reactor produces said CO at a rate that is at least 10 percent and not more than 80 percent of the rate of introduction of said biomass into said conversion reactor on a weight basis, wherein said conversion reactor produces said methane at a rate that is at least 0.5 percent and not more than 30 percent of the rate of introduction of said biomass into said conversion reactor on a weight basis, wherein said conversion reactor produces olefins at a rate that is at least 2 percent and not more than 40 percent of the rate of introduction of said biomass into said conversion reactor on a weight basis, wherein said conversion reactor produces water at a rate that is at least 4 percent and not more than 50 percent of the rate of introduction of said biomass into said conversion reactor on a weight basis.

14. The process of claim 1 further comprising recovering from said hydrogen-enriched stream at least one of the following recovered streams:
   (i) a syngas stream comprising at least a portion of said generated hydrogen and at least a portion of said CO, wherein said generated hydrogen and said CO make up at least 75 weight percent of said syngas stream,
   (ii) a hydrogen-rich stream, wherein said generated hydrogen makes up at least 75 weight percent of said hydrogen-rich stream,
   (iii) a carbon dioxide-rich stream comprising at least 75 weight percent carbon dioxide ($CO_2$), and/or
   (iv) a methane-rich stream, wherein said methane makes up at least 75 weight percent of said methane-rich stream.

15. The process of claim 14 wherein said generated hydrogen and said CO make up at least 95 weight percent of said syngas stream, wherein said generated hydrogen makes up at least 95 weight percent of said hydrogen-rich stream, wherein said $CO_2$ comprises at least 95 weight percent of said $CO_2$-rich stream, wherein said methane makes up at least 95 weight percent of said methane-rich stream.

16. The process of claim 14 wherein said recovering comprises pressure swing adsorption.

17. The process of claim 14 wherein said recovered streams include said syngas stream.

18. The process of claim 17 wherein said process produces said syngas stream at a rate that is at least 5 percent of the rate of introduction of said biomass into said conversion reactor on a weight basis.

19. The process of claim 17 further comprising converting at least a portion of said syngas stream to ethanol and/or Fischer-Tropsch liquids.

20. The process of claim 14 wherein said recovered streams include said hydrogen-rich stream and said $CO_2$-rich stream.

21. The process of claim 20 wherein said process produces said hydrogen-rich stream at a rate that is at least 0.5 percent of the rate of introduction of said biomass into said conversion reactor on a weight basis, wherein said process produces said $CO_2$-rich stream at a rate that is at least 5 percent of the rate of introduction of said biomass into said conversion reactor on a weight basis.

22. The process of claim 20 further comprising using at least a portion of said hydrogen-rich stream to hydrotreat at least a portion of said condensed and separated bio-oil and sequestering at least a portion of said $CO_2$-rich stream.

23. The process of claim 14 wherein said recovered streams include said hydrogen-rich stream, said $CO_2$-rich stream, and said methane-rich stream.

24. The process of claim 23 wherein said process produces said hydrogen-rich stream at a rate that is at least 0.5 percent of the rate of introduction of said biomass into said conversion reactor on a weight basis, wherein said process produces said $CO_2$-rich stream at a rate that is at least 5 percent of the rate of introduction of said biomass into said conversion reactor on a weight basis, wherein said process produces said methane-rich stream at a rate that is at least 0.5 percent of the rate of introduction of said biomass into said conversion reactor on a weight basis.

25. The process of claim 23 further comprising using at least a portion of said hydrogen-rich stream to hydrotreat at least a portion of said condensed and separated bio-oil, sequestering at least a portion of said $CO_2$-rich stream, and using at least a portion of said methane-rich stream in a cogeneration process.

26. A process for producing bio-oil and processing byproducts of bio-oil production, said process comprising:
 (a) pyrolyzing biomass in a riser reactor in the presence of a catalyst to thereby produce a reactor effluent comprising bio-oil, carbon monoxide (CO), olefins, and methane, wherein the weight ratio of said CO to said bio-oil in said reactor effluent is at least 0.5:1, wherein the weight ratio of said olefins to said bio-oil in said reactor effluent is at least 0.1:1, wherein the weight ratio of said methane to said bio-oil in said reactor effluent is at least 0.05:1;
 (b) condensing and separating a substantial portion of said bio-oil from said reactor effluent, thereby leaving an uncondensed stream comprising at least a portion of said methane and at least a portion of said CO; and
 (c) generating hydrogen from at least a portion of said uncondensed stream to thereby produce a hydrogen-enriched stream comprising generated hydrogen;
 (d) recovering from at least a portion of said hydrogen-enriched stream at least one of the following recovered streams:
  (i) a syngas stream comprising hydrogen and at least a portion of said CO, wherein said hydrogen and said CO make up at least 75 weight percent of said syngas stream,
  (ii) a hydrogen-rich stream, wherein hydrogen makes up at least 75 weight percent of said hydrogen-rich stream,
  (iii) a carbon dioxide-rich stream comprising at least 75 weight percent carbon dioxide ($CO_2$), or
  (iv) a methane-rich stream, wherein said methane makes up at least 75 weight percent of said methane-rich stream,
 wherein when said syngas stream is recovered in step (d) said process produces said syngas stream at a rate that is at least 5 percent of the rate of introduction of said biomass into said conversion reactor on a weight basis, wherein when said hydrogen-rich stream is recovered in step (d) said process produces said hydrogen-rich stream at a rate that is at least 0.5 percent of the rate of introduction of said biomass into said conversion reactor on a weight basis, wherein when said $CO_2$-rich stream is recovered in step (d) said process produces said $CO_2$-rich stream at a rate that is at least 5 percent of the rate of introduction of said biomass into said conversion reactor on a weight basis, wherein when said methane-rich stream is recovered in step (d) said process produces said methane-rich stream at a rate that is at least 0.5 percent of the rate of introduction of said biomass into said conversion reactor on a weight basis.

27. The process of claim 26 wherein said recovered streams include said syngas stream and not said hydrogen-rich stream and not said methane-rich stream and not said $CO_2$-rich stream.

28. The process of claim of claim 27 further comprising converting at least a portion of said syngas stream to ethanol and/or Fischer-Tropsch liquids.

29. The process of claim 26 wherein said recovered streams include said hydrogen-rich stream and said $CO_2$-rich stream and not said syngas stream and not said methane-rich stream.

30. The process of claim 29 wherein said process produces said hydrogen-rich stream at a rate that is at least 1 percent of the rate of introduction of said biomass into said conversion reactor on a weight basis, wherein said process produces said $CO_2$-rich stream at a rate that is at least 10 percent of the rate of introduction of said biomass into said conversion reactor on a weight basis.

31. The process of claim 26 wherein said recovered streams include said hydrogen-rich stream, said $CO_2$-rich stream, and said methane-rich stream and not said syngas stream.

32. The process of claim 31 wherein said process produces said hydrogen-rich stream at a rate that is at least 1 percent of the rate of introduction of said biomass into said conversion reactor on a weight basis, wherein said process produces said $CO_2$-rich stream at a rate that is at least 10 percent of the rate of introduction of said biomass into said conversion reactor on a weight basis, wherein said process produces said methane-rich stream at a rate that is at least 1 percent of the rate of introduction of said biomass into said conversion reactor on a weight basis.

33. The process of claim 26 wherein said generating of step (c) comprises reacting water with at least a portion of said CO and/or at least a portion of said methane to generate said hydrogen-enriched stream.

34. The process of claim 33 further comprising hydrotreating at least a portion of said condensed and separated bio-oil using at least a portion of said generated hydrogen.

35. The process of claim 26 wherein the weight ratio of said CO to said bio-oil in said reactor effluent is at least 1:1, wherein the weight ratio of said olefins to said bio-oil in said reactor effluent is at least 0.4:1, wherein the weight ratio of said methane to said bio-oil in said reactor effluent is at least 0.2:1, wherein said condensed and separated bio-oil has an oxygen content of less than 25 weight percent.

36. A system for producing bio-oil, said system comprising:
 a biomass feedstock source for providing solid particulate biomass;
 a conversion reactor for thermally converting at least a portion of said solid particulate biomass feedstock into a reactor effluent comprising bio-oil, carbon monoxide (CO), olefins, and methane;
 a partial condenser for partially condensing at least a portion of said reactor effluent into a bio-oil stream and an uncondensed stream;
 an olefin removal unit for removing olefins from said uncondensed stream thereby providing an olefin-depleted stream;
 a hydrogen generation unit having a water inlet, wherein said hydrogen generation unit is operable to generate hydrogen by reacting water with CO and/or methane from said olefin-depleted stream; and
 a hydrotreater for reacting at least a portion of said bio-oil stream with at least a portion of the generated hydrogen from said hydrogen generation unit.

37. The system of claim 36 further comprising a pressure swing adsorption unit for recovering at least a portion of the generated hydrogen from said hydrogen generation unit.

38. The system of claim 36 wherein said hydrogen generation unit comprises a methane reformer and/or a water gas shift reactor.

39. The system of claim 36 wherein said conversion reactor is a riser reactor.

* * * * *